(12) United States Patent
Siripurapu et al.

(10) Patent No.: US 10,620,701 B2
(45) Date of Patent: Apr. 14, 2020

(54) METHOD AND SYSTEM FOR IMPROVING APPLICATION ERGONOMICS IN A HAND-HELD DEVICE

(71) Applicant: Wipro Limited, Bangalore (IN)

(72) Inventors: Rahul Siripurapu, Bengaluru (IN);
Vinod Pathangay, Bangalore (IN)

(73) Assignee: Wipro Limited, Bangalore (IN)

( * ) Notice: Subject to any disclaimer, the term of this patent is extended or adjusted under 35 U.S.C. 154(b) by 449 days.

(21) Appl. No.: 15/082,288

(22) Filed: Mar. 28, 2016

(65) Prior Publication Data

US 2017/0235365 A1 Aug. 17, 2017

(30) Foreign Application Priority Data

Feb. 11, 2016 (IN) .............................. 201641004821

(51) Int. Cl.
*G06F 3/01* (2006.01)
*G06F 3/0481* (2013.01)

(52) U.S. Cl.
CPC ............ *G06F 3/015* (2013.01); *G06F 3/0481* (2013.01)

(58) Field of Classification Search
CPC ....................................................... G06F 3/015
See application file for complete search history.

(56) References Cited

U.S. PATENT DOCUMENTS

| | | | |
|---|---|---|---|
| 6,597,384 B1 | 7/2003 | Harrison | |
| 8,368,658 B2 * | 2/2013 | Brisebois | ................ G06F 3/044 |
| | | | 345/173 |
| 8,497,847 B2 * | 7/2013 | Brisebois | ................ G06F 3/021 |
| | | | 345/173 |
| 8,593,558 B2 * | 11/2013 | Gardiner | ............... G06F 1/1626 |
| | | | 348/191 |
| 8,860,765 B2 | 10/2014 | Kilpatrick, II et al. | |
| 8,954,099 B2 | 2/2015 | Forutanpour et al. | |
| 9,084,938 B2 | 7/2015 | Osman et al. | |
| 9,108,114 B2 | 8/2015 | Goh et al. | |
| 9,280,261 B2 * | 3/2016 | Yach | ...................... G06F 1/1626 |
| 9,349,035 B1 * | 5/2016 | Gerber | ............... G06K 9/00013 |
| 2005/0035955 A1 | 2/2005 | Carter et al. | |
| 2006/0238517 A1 * | 10/2006 | King | ..................... G06F 1/1626 |
| | | | 345/173 |
| 2007/0296820 A1 * | 12/2007 | Lonn | .................. G06K 9/00248 |
| | | | 348/207.99 |

(Continued)

FOREIGN PATENT DOCUMENTS

EP 2 211 256 A1 7/2010

*Primary Examiner* — Patrick F Marinelli
(74) *Attorney, Agent, or Firm* — Finnegan, Henderson, Farabow, Garrett & Dunner, LLP

(57) ABSTRACT

The present disclosure relates to a method and system for improving application ergonomics in a hand-held device. The application ergonomics is improved by a layout optimizing unit of the hand-held device which detects a touch on the hand-held device and receives one or more signals corresponding to the region of the touch on the hand-held device. The one or more signals received are validated by the layout optimizing unit and usage of at least one hand of both hands is determined based on the validated signals. The layout optimizing unit determines a user interface layout of the hand-held device based on the determined usage to improve the application ergonomics of the hand-held device.

8 Claims, 5 Drawing Sheets

(56) References Cited

U.S. PATENT DOCUMENTS

| | | | |
|---|---|---|---|
| 2009/0002335 A1* | 1/2009 | Chaudhri | G06F 3/04815 345/173 |
| 2009/0064055 A1* | 3/2009 | Chaudhri | G06F 3/04817 715/863 |
| 2009/0178008 A1* | 7/2009 | Herz | G06F 3/04817 715/840 |
| 2009/0195959 A1* | 8/2009 | Ladouceur | G06F 3/0202 361/283.1 |
| 2010/0060664 A1* | 3/2010 | Kilpatrick, II | G06F 1/1616 345/650 |
| 2010/0066667 A1* | 3/2010 | MacDougall | G06K 9/00228 345/156 |
| 2010/0066763 A1* | 3/2010 | MacDougall | G06F 1/1626 345/656 |
| 2010/0088532 A1 | 4/2010 | Pollock et al. | |
| 2011/0312349 A1* | 12/2011 | Forutanpour | G06F 1/1626 455/466 |
| 2012/0057064 A1 | 3/2012 | Gardiner et al. | |
| 2012/0284620 A1 | 11/2012 | Yach et al. | |
| 2014/0213140 A1* | 7/2014 | Goh | A63H 3/28 446/175 |
| 2014/0249763 A1* | 9/2014 | Shimuta | A61B 5/6898 702/19 |
| 2015/0015486 A1* | 1/2015 | Osman | A63F 13/655 345/156 |
| 2015/0135310 A1* | 5/2015 | Lee | A61B 5/681 726/20 |
| 2017/0316419 A1* | 11/2017 | Laporta | G06Q 20/3276 |
| 2018/0235542 A1* | 8/2018 | Yun | A61B 5/0205 |

* cited by examiner

METHOD AND SYSTEM FOR IMPROVING APPLICATION ERGONOMICS IN A HAND-HELD DEVICE

FIELD OF THE INVENTION

The present subject matter is related in general to displays for hand-held devices, more particularly, but not exclusively to, a method and system for improving application ergonomics in a hand-held device.

BACKGROUND

Hand-held devices which are also known as portable device, like mobile phones, tablets and others have become one of the most commonly used electronic devices worldwide. With the advancement in the technology especially mobile technology, there has been an enormous increase in the development of applications. The applications are frequently used by users in their daily lives. On one hand, the intelligence behind these applications has grown significantly making them very useful and valuable. On the other hand, the numbers of applications being used by the users are very high. The use of the applications typically requires the users to navigate a user interface, which may include virtual push buttons, icons as well as a display. The contents may not be displayed in the application based on the users' orientation and the usage of the hands. In such cases, the users find it difficult to view the information on the hand-held device and also, the users may face physical pain and other inconvenience.

In one of the existing techniques, efficiency of the hand-held device is improved by orienting the displays so that the user can see the content upright and use the hand-held device comfortably. However, since these hand-held devices are designed to be used in both portrait and landscape mode, it becomes difficult to identify which mode and User Interface (UI) layout is best suited for the users. In the existing technique, usage efficiency of the hand-held device is provided by using the device's accelerometer for setting the orientation. However, this is based on the assumption that the user is always upright while using the device and it fails when the user is lying horizontally and using the device.

In another existing technique, to identify the orientation of the device, face orientation is detected by using the camera present on the device. But, in this case, some of the devices may not have a user facing camera and if the user facing camera is present, it is possible that the user's face may be occluded. In addition to this, the users may not wish their faces to be imaged always due to privacy reasons. Yet another existing technique makes use of the proximity sensors present in the device to determine the location of a touch made by the users on the hand-held device. But the proximity sensors fail to identify which hand is being used, type of keyboard layout used etc. Thus, there is a need for a more reliable system in order to improve the application ergonomics in a hand-held device used by the users.

SUMMARY

Disclosed herein is a method and system for improving application ergonomics in a hand-held device. The application ergonomics is improved by a layout optimizing unit configured in the hand-held device. The layout optimizing unit identifies the usage of hands based on the one or more signals received which includes Electrocardiogram (ECG) signals and Photo Photoplethysmogram (PPG) signals and improves the application ergonomics by determining a user interface layout of the hand-held device.

In an embodiment, the present disclosure relates to a method for improving the application ergonomics, the method comprises detecting a touch on the hand-held device, receiving one or more signals corresponding to region of the touch on the hand-held device. The one or more signals comprise Electrocardiogram (ECG) signals and Photo Photoplethysmogram (PPG) signals. The method comprises validating, the one or more signals, determining usage of at least one hand of both hands based on the validation and determining User Interface (UI) layout of the hand-held device based on the determined usage to improve the application ergonomics in the hand-held device.

In an embodiment, the present disclosure relates to a layout optimizing unit to improve the application ergonomics in a hand-held device. The layout optimizing unit comprises a processor and a memory communicatively coupled to the processor, wherein the memory stores processor executable instructions, which on execution cause the layout optimizing unit to detect a touch on the hand-held device, receive one or more signals corresponding to region of the touch on the hand-held device. The one or more signals comprise Electrocardiogram (ECG) signals and Photo Photoplethysmogram (PPG) signals. The layout optimizing unit validates the one or more signals, determines usage of at least one hand of both hands based on the validation and determine User Interface (UI) layout of the hand-held device based on the determined usage to improve the application ergonomics in the hand-held device.

In an embodiment, the present disclosure relates to a non-transitory computer readable medium including instructions stored thereon that when processed by at least one processor cause a layout optimizing unit to detect a touch on the hand-held device, receive one or more signals corresponding to region of the touch on the hand-held device, wherein one or more signals comprise Electrocardiogram (ECG) signals and Photo Photoplethysmogram (PPG) signals, validate the one or more signals, determine usage of at least one hand of both hands based on the validation and determine User Interface (UI) layout of the hand-held device based on the determined usage to improve the application ergonomics in the hand-held device.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

Figure 1A:
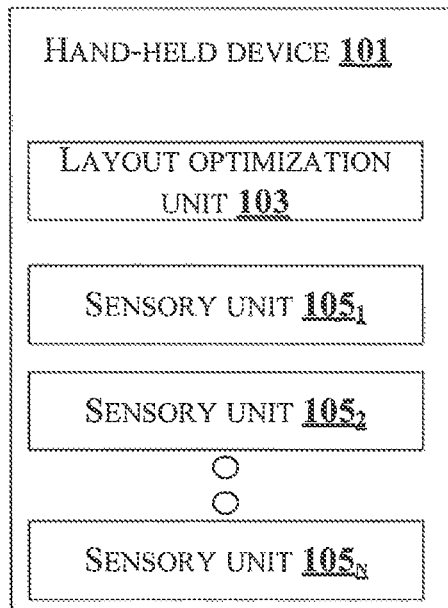
FIG. 1a illustrates an exemplary hand-held device for improving the application ergonomics in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

The present disclosure relates to a method for improving application ergonomics in a hand-held device. The method improves application ergonomics by determining a user interface layout for the hand-held device. The present disclosure provides a layout optimizing unit which determines user interface layout by identifying usage of at least one hand of both the hands in the hand-held device. The usage of hands is determined based on the validated ECG and PPG signals. The ECG and PPG signals are received corresponding to a region of touch in the hand-held device. The present disclosure improves the application ergonomics by determining the user interface layout based on the usage of hands of the users. In such a way, application ergonomics in a hand-held device is improved which can dynamically determine the UI layout of the hand-held device based on the usage of one hand or two hands by the users.

FIG. 1a illustrates an exemplary hand-held device for improving the application ergonomics in accordance with some embodiments of the present disclosure.

As shown in FIG. 1a, a hand-held device 101 comprises a layout optimizing unit 103 and a sensory unit $105_1$, sensory unit $105_2$ . . . sensory unit $105_n$ (sensory units 105). The hand-held device 101 may include, but is not limited to, mobile phones, tablets, notebook, PC etc. The hand-held device 101 comprises plurality of applications which are used by the users in their day to day lives. In an embodiment, the plurality of application may display information that needs to be aligned according to the user's orientation. Also, the application may require using an on-screen keypad which needs to be optimized based on the usage of hands.). The plurality of applications is selected and used by users depending on their requirements. The sensory units 105 present in the hand-held device 101 are used for detecting the touch on the hand-held device 101. In an embodiment, the sensory units 105 comprises electrodes for sensing ECG signals, photoelectric sensors for PPG sensing and proximity sensors for detecting a touch on the hand-held device 101. The electrodes are used for obtaining the signals from the bare hands of the users who make any contacts with the hand-held device 101. The sensory units 105 are evenly spread around the edges of the hand-held device 101 in the form of intermittent metal strips along the four edges of the hand-held device 101. Further, the hand-held device 101 comprises layout optimizing unit 103 which is used for improving the application ergonomics in the hand-held device 101 and is explained in FIG. 1b.

Figure 1B:
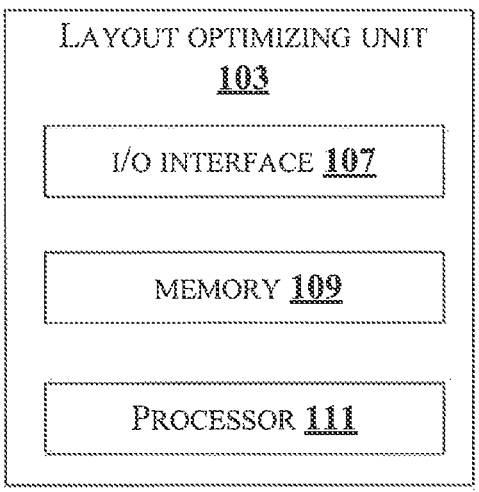
FIG. 1b illustrates a layout optimizing unit of the hand-held device in accordance with some embodiment of the present disclosure.

FIG. 1b illustrates a layout optimizing unit of the hand-held device in accordance with some embodiment of the present disclosure.

FIG. 1b shows a layout optimizing unit 103 of the hand-held device 101. The layout optimizing unit 103 comprises an I/O interface 107, memory 109 and processor 111. The layout optimizing unit 103 improves the application ergonomics in the hand-held device 101 by dynamically determining user interface layout of the hand-held device 101 based on the usage of at least one hand of both hands of the users. The usage of at least one hand of the both hands is determined by the layout optimizing unit 103 by identifying valid ECG or PPG signals.

Initially, the proximity sensors sense a touch signal on the hand-held device 101. The layout optimizing unit 103 detects a touch on the hand-held device 101 based on the touch signal received from the proximity sensors. Upon detection of the touch, the layout optimizing unit 103 receives one or more signals from the sensory units 105. The layout optimizing unit 103 of the hand-held device 101 receives ECG and/or PPG signals for the region where a touch of user is detected. The ECG signals are obtained from the electrodes placed at the edges of the hand-held device 101 corresponding to the region of touch. Further, the layout optimizing unit 103 of the hand-held device 101 determines the edge of the hand-held device 101 touched by the user based on the region of the touch. The edge of the hand-held device 101 comprises left, right, top and bottom edge of the hand-held device 101. In an embodiment, the users employ a minimalistic one hand using only two fingers to more than two fingers while holding the hand-held device 101. In such cases, the signals may be obtained from only one electrode. Further, if the signals are obtained from more than two electrodes, then various combinations of the signals are taken as positive and negative leads and are tested for valid ECG signals. Further, the ECG signals are validated by extracting frequency spectrum from the signal and comparing with a predefined threshold value of ECG signal. In an embodiment, the human ECG signal lies within the bandwidth range of 0.16 Hertz to 25 Hertz and in the amplitude ranges of 0.3 to 2 millivolts. The ECG signals are usually obtained when the users touch the hand-held device 101 with both the hands. Further, the PPG signals are obtained by identifying pulse of the user through user contact with the hand-held device 101. In an exemplary embodiment, a PPG signal is obtained by using a pulse oximeter which illuminates the skin and measures changes in light absorption. The use of one hand is detected if the PPG signal is obtained from either sides of the hand-held device 101. Further, the layout optimizing unit 103 determines the user interface layout of the hand-held device 101 dynamically depending on the usage of the hands. The user interface layout is determined by identifying arrangement of the user interface elements of the hand-held device 101 and the orientation of the UI layout based on the usage of the hands. For example, orienting the keypad on both the sides depending on the usage of both the hands, orienting the keypad dynamically to the left on determining the use of left hand and similarly, dynamically arranging the keypad towards right side on identifying the use of right hand. The arrangement of user interface elements and orientation dynamically provides ease of use to the users and thus improves the application ergonomics in the hand-held device 101.

The layout optimizing unit 103 comprises the I/O Interface 107, the memory 109 and the processor 111. The I/O interface 107 is configured to receive one or more touch signals from the sensory units 105 corresponding to region of the touch on the hand-held device 101. Based on the detection, the layout optimizing unit 103 receives one or more signals. The one or more signals include, but are not limited to, ECG signals and PPG signals. In an embodiment, the one or more signals are processed by the processor 111 in order to identify ECG and PPG by eliminating noise signals.

The received information from the I/O interface 107 is stored in the memory 109. The memory 109 is communicatively coupled to the processor 111 of the layout optimizing unit 103. The memory 109 also stores processor instructions which cause the processor 111 to execute the instruction in order to improve the application ergonomics in the hand-held device 101.

Figure 2A:
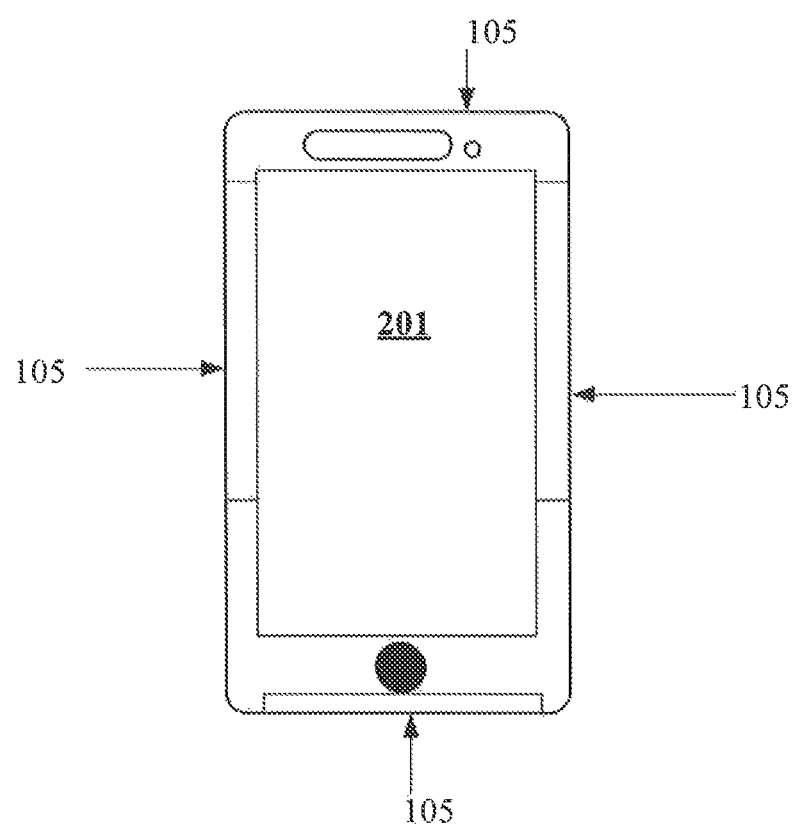
FIG. 2a shows an exemplary representation of a hand-held device, i.e. a mobile device in accordance with some embodiments of the present disclosure.

FIG. 2*a* shows an exemplary representation of a hand-held device, i.e. a mobile device in accordance with some embodiments of the present disclosure.

Figure 2B:
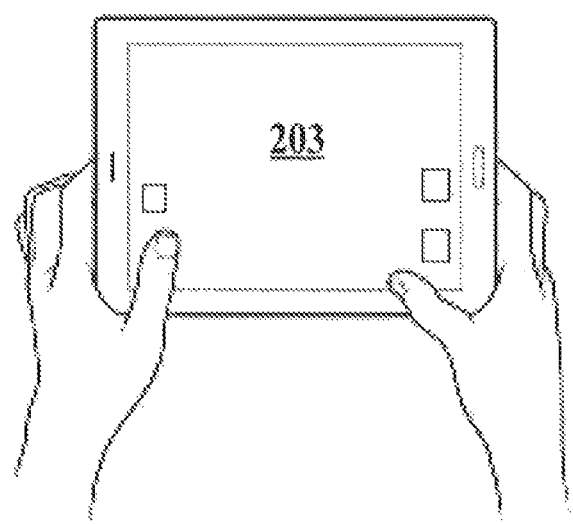
FIG. 2b shows an exemplary representation of a hand-held device, i.e. a tablet device operated by a user in accordance with some embodiments of the present disclosure.
Figure 2C:
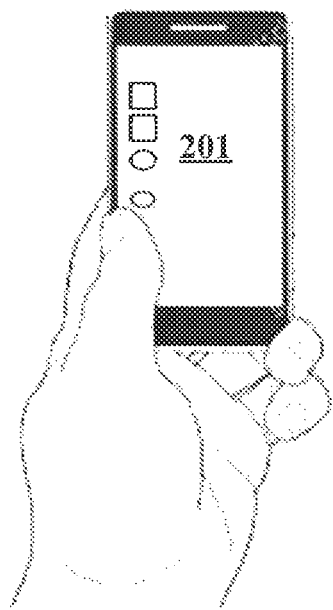
FIG. 2c shows an exemplary representation of a hand-held device, i.e. a mobile device operated by a user in accordance with some embodiments of the present disclosure.

As shown in FIG. 2*a*, a mobile device 201 is an example of the hand-held devices 101. The mobile device 201 comprises sensory units 105 placed at the four edges of the mobile device 201. The sensory units 105 are placed at all the edges to detect a touch of the users on the mobile device 201. The mobile device 201 also comprises the layout optimizing unit 103 (not shown in figure) for improving the application ergonomics in the hand-held device 101. In an embodiment, the mobile device 201 is a touchscreen mobile device 201, such that the users can input or control the mobile device 201 by single or multi-touch gestures by touching the screen with the hands. The usage of the hands of the users is detected upon determining valid ECG and/or PPG signals. In an embodiment, if neither ECG nor PPG signals are detected, then the mobile device 201 is not held by the users. FIG. 2*c* shows an exemplary representation of a hand-held device, i.e. a mobile device operated by a user in accordance with some embodiments of the present disclosure.

As shown in FIG. 2*c*, the mobile device 201 is held by a user. The usage of the hands on the mobile device 201 is determined based on the validity of the one or more signals. FIG. 2*b* shows an exemplary representation of a hand-held device, i.e. a tablet device operated by a user in accordance with some embodiments of the present disclosure. As shown in FIG. 2*b*, the tablet device 203 is held by a user with both the hands.

The layout optimizing unit 103 configured in the tablet device 203 initially detects a touch on the tablet device 203 based on the touch signals received from the proximity sensors of the tablet device 203. Upon, detecting a touch on the tablet device 203, the layout optimizing unit 103 receives one or more signals, wherein the one or more signals comprises either ECG or PPG signals. Further, the layout optimizing unit 103 of the tablet device 203 determines the edge of the tablet device 203 touched by the user based on the region of the touch. The region of touch is determined by the electrodes sending one or more signals, wherein a set of electrodes are mapped to a predefined region. Further, each region is mapped to an edge of the hand-held device. For example, if the region of touch of the user on the hand-held device corresponds to left edge of the phone, then the user is said to have touched the hand-held device on the left side. In an embodiment, the ECG signal is validated by determining the signals to be in a predefined range and from a positive and negative lead. The layout optimizing unit 103 determines the bandwidth and amplitude range of the received signals in order to validate that the signals received are human ECG and PPG signals. The valid ECG signals for human being lies in the bandwidth range of 0.16 Hertz to 25 Hertz and in the amplitude range of 0.3 to 2 millivolts. The usage of both the hands is determined by the layout optimizing unit 103 (not shown in figure) upon identifying the ECG signals from more than two electrodes. Further, the layout optimizing unit 103 determines the touch of the user on the edge of the device through one of right hand and left hand of the both hands based on the region of the touch on the tablet device 203 and the ECG signals. In an embodiment, ECG signals of left hand and right hand of users are different. This value of ECG signal is used to determine which hand of the user is touching the edge of the hand-held device. The various combinations of the signals are taken as positive and negative leads and are tested for ECG. In an embodiment, ECG circuit is said to be complete when positive and negative combination of signals are detected. The positive and negative combinations are obtained from the opposing hands contacts of the users. In an embodiment, the opposing hands indicate left and right hand of the user. In the FIG. 2*b*, the layout optimizing unit 103 of the tablet device 203 identifies valid ECG signals and indicates the usage of both the hands on the tablet device 203 by the user. Further, if ECG signals are not obtained, the layout optimizing unit 103 checks for the valid PPG signals. The usage of one hand is identified upon determining valid PPG signals as shown in FIG. 2c. The PPG signals are validated firstly by checking the identified signals in the bandwidth range of 1 to 1.5 Hertz. In FIG. 2c, on identifying the absence of the valid ECG signals, the layout optimizing unit 103 (not shown in figure) placed in the mobile device 201 identifies the presence of PPG signals by identifying the pulse of the users through the user contact with the mobile device 201. Further, the usage of one hand is detected since the valid ECG signals are not obtained, and PPG signals are detected on either sides of the mobile device 201, i.e. left hand side or right hand side. In an embodiment, the layout optimizing unit 103 identifies the usage of the mobile device 201 by left hand on identifying the pulses originating from photoelectric sensors configured on left side of the mobile device 201 and similarly, the usage of mobile device 201 from right hand on identifying the pulse originating from photoelectric sensors configured on right side of the mobile device 201. Further, the layout optimizing unit 103 on the mobile device 201 and the tablet device 203 determines a user interface layout of the mobile device 201 and tablet device 203 based on the usage of hands. The user interface layout is customized by arranging the user interface elements and orientation of the user interface layout based on the usage of the hands. In an embodiment, the user interface elements may include but not limited to icons, menus, sliders, tabs, insertion points etc. The orientation of the mobile device 201 and the tablet device 203 is determined depending on the usage of hands on the mobile device 201 and tablet device 203 by the users. For example, since the tablet device 203 is held by both the hands as identified by the layout optimizing unit 103 of the tablet device 203, the keypad of the tablet device 203 are arranged accordingly for the usage by both the hands. Further, in FIG. 2c, since the mobile device 201 is held only by the left hand of the user, the layout optimizing unit 103, arranges the keypad towards left for only left hand usage and similarly on determining the usage from right hand, the keypads are oriented towards right side of the mobile device 201. As shown in FIG. 2c, the orientation is identified as left orientation and the user interface elements like the icons are arranged towards the left. In an embodiment, the usage of hand information can be fed to another system along with the accelerometer and camera data to fix the screen orientation.

Figure 3:
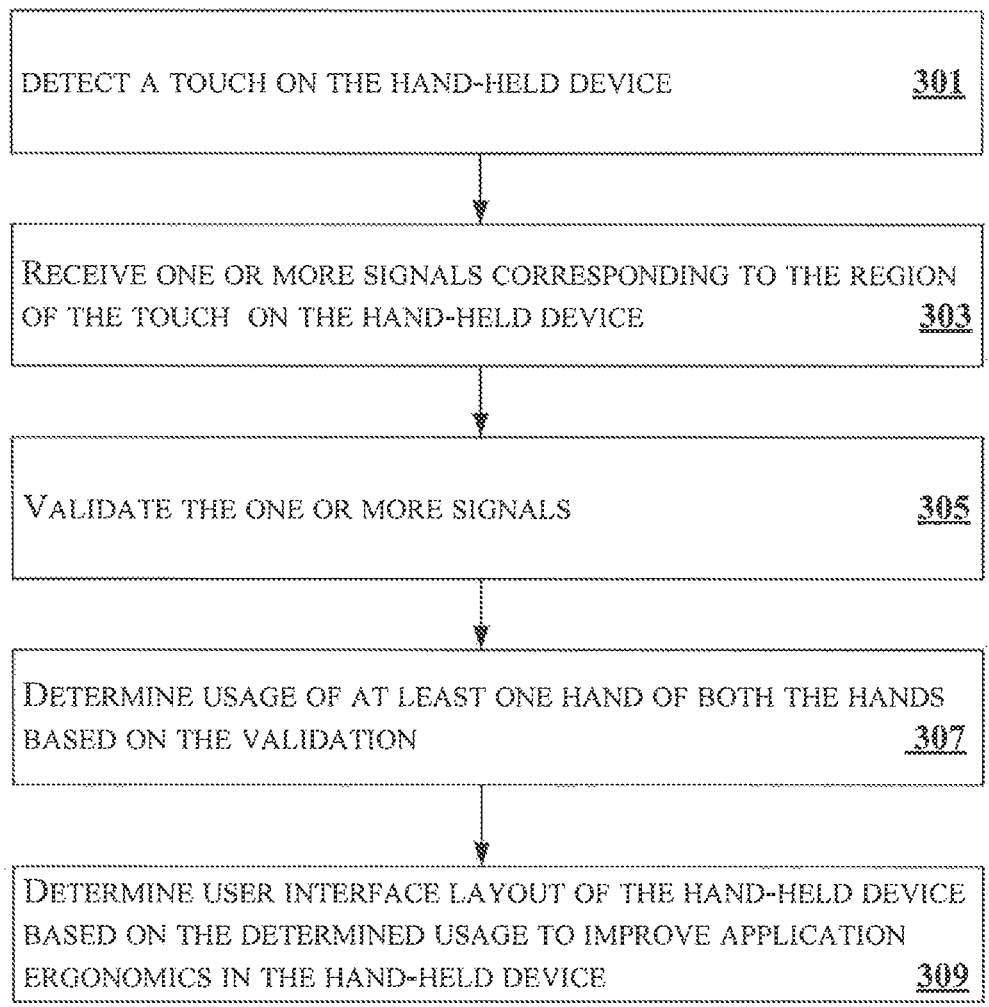
FIG. 3 illustrates a flowchart showing a method for improving application ergonomics in a hand-held device in accordance with some embodiments of present disclosure.

FIG. 3 illustrates a flowchart showing a method for improving application ergonomics in a hand-held device in accordance with some embodiments of present disclosure.

As illustrated in FIG. 3, the device 300 comprises one or more blocks for improving application ergonomics. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

A hand-held device 101 comprises plurality of applications running on the hand-held device 101. The plurality of applications displays information on the users which may be aligned according to the usage of the hands by the users.

At block 301, the layout optimizing unit 103 detects a touch on the hand-held device 101 based on the touch signals received from the proximity sensors. Further, the edge of the hand-held device 101 touched by the user is determined based on the region of the touch.

At block 303, the layout optimizing unit 103 receives one or more signals corresponding to the region of the touch on the hand-held device 101. The more or more signals are Electrocardiogram (ECG) signals and Photo Photoplethysmogram (PPG) signals.

At block 305, the layout optimizing unit 103 validates the one or more signals received. The ECG signals are validated upon determining the bandwidth of the received signals within the range of 0.16 to 25 Hertz. Further, the ECG signals are validated based on the combination of positive and negative leads of the signals. Further, the layout optimizing unit 103 determines the touch of the user on the edge of the device through one of right hand and left hand of both the hands based on the region of the touch on the tablet device 203 and the ECG signals. The PPG signals are validated by identifying the pulse of the user through the user contact with the hand-held device 101. The PPG signals are validated by determining the bandwidth of the received signals within the range of 1 to 1.5 Hertz.

At block 307, the layout optimizing unit 103 determines usage of at least one hand of both the hands based on the validation. The usage of one hand is determined on identifying the valid PPG signals and the usage of both the hands is determined by identifying the valid ECG signals.

At block 309, the layout optimizing unit 103 determine the user interface layout of the hand-held device 101 based on the determined usage to improve application ergonomics in a hand-held device 101.

An embodiment of the present disclosure improves application ergonomics in the hand-held device by changing the user interface layout of the hand-held device dynamically to suit one or both hands operations.

An embodiment of the present disclosure detects the usage of one or both hands on the hand-held device and thereby changes the user interface elements dynamically to facilitate easy usage.

An embodiment of the present disclosure can be used for game control, e-commerce, banking applications for switching between one hand and two hands operations.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media comprise all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as an optical fibre, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" comprises non-transitory computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 3 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
| --- | --- |
| 101 | Hand-held device |
| 103 | Layout optimizing unit |
| 105 | Sensory units |
| 107 | I/O interface |
| 109 | Memory |
| 111 | Processor |
| 113 | Memory |
| 115 | Processor |
| 201 | Mobile device |
| 203 | Tablet device |

What is claimed is:

1. A method for determining user interface layout in a handheld device, the method comprising:
   detecting, by a layout optimizer, a touch on the hand-held device by a user;
   receiving, by the layout optimizer, a physiological signal corresponding to a region of the touch on the handheld device, wherein the physiological signal comprises an Electrocardiogram (ECG) signal and a Photo Photoplethysmogram (PPG) signal;
   validating, by the layout optimizer, the physiological signal by determining the bandwidth and amplitude range of the received signals in order to validate that the signals received are human ECG and PPG signals;
   determining, by the layout optimizer, a usage of at least one hand of the user based on the validation; and
   determining, by the layout optimizer, a User Interface (UI) layout of the hand-held device based on the determined usage of the at least one hand of the user in the handheld device.

2. The method of claim 1, wherein validating the physiological signal comprises validating at least one of the ECG signal or the PPG signal.

3. The method of claim 2, wherein the ECG signal comprises a bandwidth range of 0.16 to 25 hertz.

4. The method of claim 1, further comprising determining an edge of the hand-held device touched by the user based on the region of the touch on the hand-held device.

5. The method of claim 4, further comprising determining the touch of the user on the edge of the hand-held device through one of a right hand or a left hand of the user based on the region of the touch on the hand-held device and the ECG signal.

6. The method of claim 1, wherein validating the PPG signal comprises identifying a pulse of the user through the touch on the hand-held device.

7. The method of claim 6, wherein the usage of at least one of a right hand or a left hand of the user is determined by identifying the valid PPG signal.

8. The method of claim 1, wherein determining the user interface layout of the hand-held device comprises determining at least one of arrangement of user interface elements and an orientation of the user interface layout based on the usage of the at least one hand of the user.

* * * * *